US006436297B1

United States Patent
Lebeau et al.

(10) Patent No.: US 6,436,297 B1
(45) Date of Patent: Aug. 20, 2002

(54) DEFLUORIDATION OF WASTE WATER

(75) Inventors: Jacques Lebeau, Charentilly; Christophe Maury, Semblancay, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/198,417

(22) Filed: Nov. 24, 1998

(30) Foreign Application Priority Data

Nov. 28, 1997 (FR) ............................................. 97 15332

(51) Int. Cl.[7] ................................................. C02F 1/52
(52) U.S. Cl. ...................... 210/724; 210/726; 210/752; 210/915
(58) Field of Search ................................ 210/724, 726, 210/752, 915

(56) References Cited

U.S. PATENT DOCUMENTS

| | | | |
|---|---|---|---|
| 4,028,137 A | 6/1977 | Nishimura et al. | |
| 4,028,237 A | 6/1977 | Nishimura et al. | ............ 210/45 |
| 4,808,316 A | * 2/1989 | Otomura et al. | ............ 210/915 |
| 5,043,072 A | * 8/1991 | Hitotsuyanagi et al. | ...... 210/915 |
| 5,876,685 A | * 3/1999 | Krulik et al. | ................ 423/488 |
| 6,042,730 A | * 3/2000 | Lahti | |

FOREIGN PATENT DOCUMENTS

| | | | |
|---|---|---|---|
| FR | A-2 362 083 | 3/1978 | ............. C02C/5/02 |
| FR | A-2 627 481 | 8/1989 | ............. C02F/1/52 |

OTHER PUBLICATIONS

Singaporean Search Report from corresponding Singapore application.
Patent Abstracts of Japan, JP–A–08 197070 (Kurita Water Ind. Patent Ltd., NEC Corp.).
Patent Abstracts of Japan, JP–A–59 193190 (Chiyoda Kako Kensetsu KK) vol. 009, No. 52 (C–269), Mar. 6, 1985.
Patent Abstracts of Japan, JP–59 00373 (Hitachi Plant Kensetsu KK), vol. 008. No. 077 (C–218), Apr. 10, 1984.
Patent Abstracts of Japan, JP–58–43282 (Hitachi Plant Kensetsu KK), vol. No. 7, No. 131 (C–169), Jun. 8, 1983.
Patent Abstracts of Japan, JP–0910548, (Mitsubishi Heavy Ind Ltd), Jan. 14, 1997.
JP 49–048151 (Nissan Engineering Co) May 10, 1974 World Patents Index.
IBM Technical Disclosure bulletin, vol. 28, No. 4, Sep. 1985, Fluoride–Removal Process Utilizing Lime And Phosphoric Acid.
French Search Report from French Patent Application 97 15332, filed Nov. 28, 1997.
Patent Abstracts of Japan, vol. 008, Mo. 077 (C–218), Apr. 10, 1984 & JP–A–59 000373 (Hitachi Plant Kensetsu KK).
Database WPI Section Ch, Week 8316 Derwent Publications Ltd., London, GB; An 83–38312K & JP–A–58 043282 (Hitachi Plant Eng. & Constr. Co.).
Patent Abstracts of Japan, vol. 009, No. 52 (C–269), Mar. 6, 1985 & JP–A–59 193190 (Chiyoda Kako Kensetsu KK).
Patent Abstracts of Japan, vol. 096, No. 012, Dec. 26, 1996 & JP–A–08 197070 (Kurita Water Ind. Ltd., NEC Corp.).

* cited by examiner

*Primary Examiner*—Betsey Morrison Hoey
(74) *Attorney, Agent, or Firm*—Wolf, Greenfield & Sacks, P.C.; James H. Morris; Robert H. Walat

(57) ABSTRACT

The present invention relates to a method of defluoridation of waste water, including a step of acid neutralization between a basic neutralization step and a decantation step.

20 Claims, 2 Drawing Sheets

DEFLUORIDATION OF WASTE WATER

BACKGROUND OF THE INVENTION

1. Field of the Invention

The present invention generally relates to the processing of waste water, and more specifically to its defluoridation. The present invention more specifically addresses effluents from silicon processings.

2. Discussion of the Related Art

The electronic industry increasingly uses silicon-based semiconductor devices. During the manufacturing processes of these devices, etching of the silicon have, in particular, to be performed by means of components containing fluorine, such as, for example, hydrofluoric acid (HF) or ammonium fluorides ($NH_4F$), which produce at the end of a process, effluents with a high concentration of fluoride ions. Such materials are particularly harmful for the environment and, accordingly, these effluents have to be defluoridated in a sewerage plant. Of course, other silicon processing is performed during manufacturing. The different effluents are gathered before being processed by the sewerage plant.

The effluents typically have concentrations in fluoride ions ranging from several tens to several hundreds of milligrams per liter, which concentrations are higher than the maximum non-polluting limit, set, for example, to 15 mg/l. To efficiently reduce, in an economically viable way, this high fluoride ion concentration in an industrial process, a physico-chemical processing based on milk of lime (calcium hydroxide $Ca(OH)_2$ in suspense in water) is used, which is based on the spontaneous precipitation, in the form of calcium fluoride ($CaF_2$), of the fluoride ions in the presence of calcium ions according to the following equilibrium:

$$2F^- + Ca^+ + \leftrightarrows CaF_2. \qquad \text{(equilibrium 1)}$$

Dead lime has the advantages of introducing calcium ions in the solution, while ensuring, by the addition of two hydroxide ions ($OH^-$) for one calcium ion ($Ca^+ +$), according to the following equilibrium:

$$Ca(OH)_2 \leftrightarrows 2OH^- + Ca^+ +, \qquad \text{(equilibrium 2)}$$

a basicity of the medium which optimizes the precipitation.

Indeed, for fluoride ions, the precipitation is optimal, in the presence of dead lime, in a pH interval between 8 and 9.

The conventional processing essentially includes five steps.

FIG. 1 very schematically shows an example of known sewerage plant, applied to defluoridation.

In a first step, the waste water ww is mixed with a compound liberating dissolved calcium and with a compound likely to capture dissolved protons ($H^+$). Preferably, dead lime s1 brought from a vessel 10, which answers both requirements, is used. This step will be called hereafter the basic neutralization, or basification, and enables precipitation of the fluoride ions.

In the example shown, this first step is divided into a pre-neutralization and a post-neutralization, performed until respective pH values on the order of approximately 6.5 and 9 are reached, which values are automatically controlled, for example, by a pH probe.

The initial pre-neutralization eliminates the excess fluoride ions which may be present in waste water ww before the pH increase of the post-neutralization which favors their appearance.

The pre-neutralization step is a step of mixture with lime s1 in a processing vessel 11 until a pH on the order of 6.5 to 7 is reached. The post-neutralization step is a step of reaction and pH adjustment to a value on the order of 8 to 9 in a processing vessel 12.

During the post-neutralization, all fluorine salts are assumed to dissociate and all fluoride ions are assumed to precipitate due to the excess of lime present.

The basification step is generally followed by a flocculence step which consists of introducing flocculents fa, coming from a vessel 16, to help a subsequent decantation. This flocculence step can be implemented in a settling tank 12', or in a separated vessel.

A decantation step is then performed in a decanter 13.

The liquid phase lp floating on the surface (not precipitated) is extracted from decanter 13. According to the precipitation principles of equilibrium 1, all fluoride ions are assumed to be precipitated by the excess lime and to be held by the decanter in sludge, or solid phase sp. Sludge sp is removed from the decanter, at periodic intervals, while liquid phase lp is extracted continuously.

Although it has not been shown, a low quantity of the sludge is generally brought back to processing vessel 12 to "seed" it with $CaF_2$ crystals, to favor the formation of the precipitate ($CaF_2$) in the post-neutralization step.

The fluoride content of the effluents to be rejected, that is, of liquid phase lp, is then tested. These tests, generally represented by an intermediary vessel 14, enable eventual adjustment of the final pH of the rejected water which must be substantially neutral (pH≈7), to control the ion concentrations of this liquid phase, and possibly to decide a new processing.

Finally, the effluents are removed, for example, in an urban sewage system 15.

Generally, additional recycling separation steps (not shown) are performed, preferably in combination with the tests.

The different transfers and their flow rates between the processing and/or storage vessels are controlled conventionally by pumping and/or flow methods (not shown) controlled by well known techniques, for example, electrovalves provided with usual security and manual and/or automatic control systems.

The different vessels (storage and/or processing) are also equipped with conventional mixing means to homogenize the different suspensions or solutions in temperature, concentrations, and pH.

The limits of such a dead lime method essentially appear from the combination of the two equilibriums 1 and 2.

In the presence of an excess of calcium ions, due to the excess of lime enabling, besides, to obtain a basic pH at the end of the neutralization (here, pH=9), the precipitation is only limited by the solubility limit of the calcium fluoride in the solution. Accordingly, this method allows, theoretically, reaching a residual concentration of fluoride ions of 8 mg/l.

In practice, higher final fluoride ion concentrations, on the order of 17 to 24 mg/l, can be observed.

SUMMARY OF THE INVENTION

An object of the present invention is to provide a novel method of defluoridation which results in a residual concentration of fluoride ions lower than 15 mg/l.

Another object of the present invention is to provide a fast, non-polluting method which allows use of already existing structures.

A first solution would be to increase the time of contact between the effluents and the lime (pre-neutralization and post-neutralization), considering that, even in the presence of a lime excess, equilibrium 1 moves very slowly towards the formation of the calcium fluoride precipitate ($CaF_2$). A prolongation of this time of exposition to lime has been found to be ineffective.

The present invention originates from a novel approach of the phenomena leading to a partial defluoridation.

The present inventors consider that, at its arrival at the level of the sewerage plant, the waste water contains different fluoric salts.

A portion of these fluoric salts, which will here be called "simple" salts, that is, having simple ionic groups such as, for example, ammonium fluoride ($NH_4F$), sodium fluoride (NaF), or even isolated fluoride ions due to an excess of hydrofluoric acid (HF), is dissociated in the conditions (pH) of the processing, and thus leads to a precipitation of fluoride ions.

The present inventors consider that other salts, which will here be designated as "complex" salts, coming from more elaborate combinations of the effluents which can even involve phenomena of complexation in the presence of metal ions, are not dissociated in the present neutralization conditions.

Thus, a characteristic of the present invention is to provide the dissociation of "complex" salts.

More specifically, the present invention provides a method of defluoridation of waste water, including a step of acid neutralization between a basic neutralization step and a decantation step.

According to an embodiment of the present invention, the acid neutralization step is performed by addition of an acid other than hydrofluoric acid (HF).

According to an embodiment of the present invention, the acid neutralization step is performed until a substantially neutral or very slightly acid pH is reached.

According to an embodiment of the present invention, the waste water comes from silicon processing.

According to an embodiment of the present invention, the acid neutralization step is performed by addition of sulfuric acid ($H_2SO_4$).

According to an embodiment of the present invention, the method implements the following successive steps:

basic pre-neutralization until a pH value of 6.5 is reached, by mixing the waste water with dead lime ($Ca(OH)_2$);

basic post-neutralization until a pH value of 8.2 is reached, by mixing the pre-neutralized solution with dead lime;

acid neutralization until a pH value included between 5.5 and 7 is reached;

decantation coupled with operations of continuous extraction of the liquid phase; and removal of the defluorided effluents.

The present invention also provides a method of purification of waste water, including a step of acid neutralization.

The foregoing objects, features and advantages of the present invention, will be discussed in detail in the following non-limiting description of specific embodiments in connection with the accompanying drawings.

DETAILED DESCRIPTION

For clarity, the representations of the different drawings are not to scale.

Figure 2:
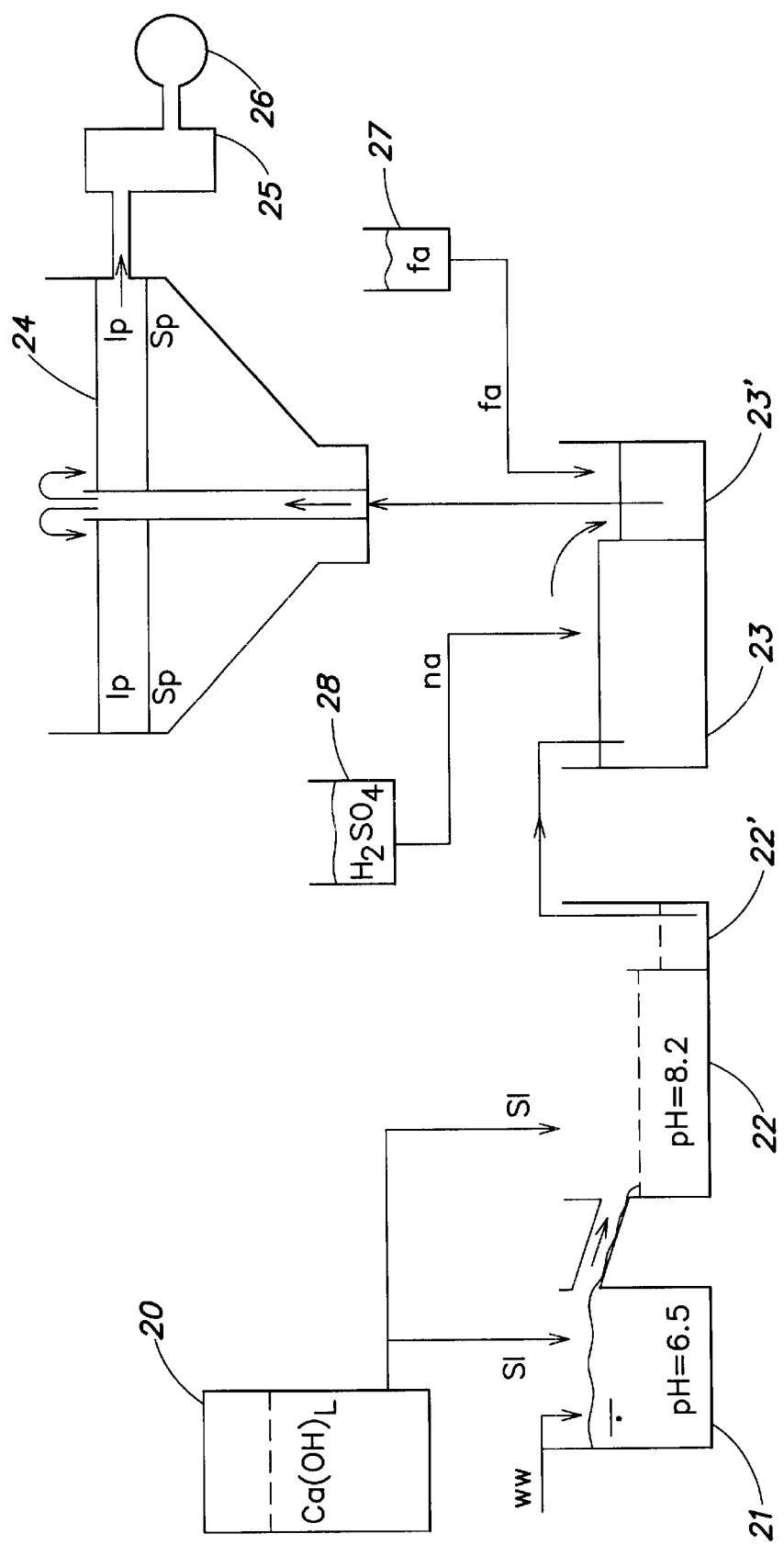
FIG. 2 shows an embodiment of a neutralization method according to the present invention.

FIG. 2 shows a preferred embodiment of the present invention.

First, waste water ww undergoes a step of basification with dead lime (sl, supplied from a vessel 20). As previously, this basic neutralization is generally performed in two steps.

The waste water is first mixed in a pre-neutralization vessel 21 to reach a pH value of 6.5.

Then, the waste water is transferred into a post-neutralization vessel 22 where it is basified a second time. Vessel 22 generally is, as previously, associated with a settling compartment 22'.

As previously, it is desired to operate at a sufficiently basic pH value to obtain a satisfying precipitation of the simple fluoride ions, that is, a value included between 8 and 9.

Figure 1:
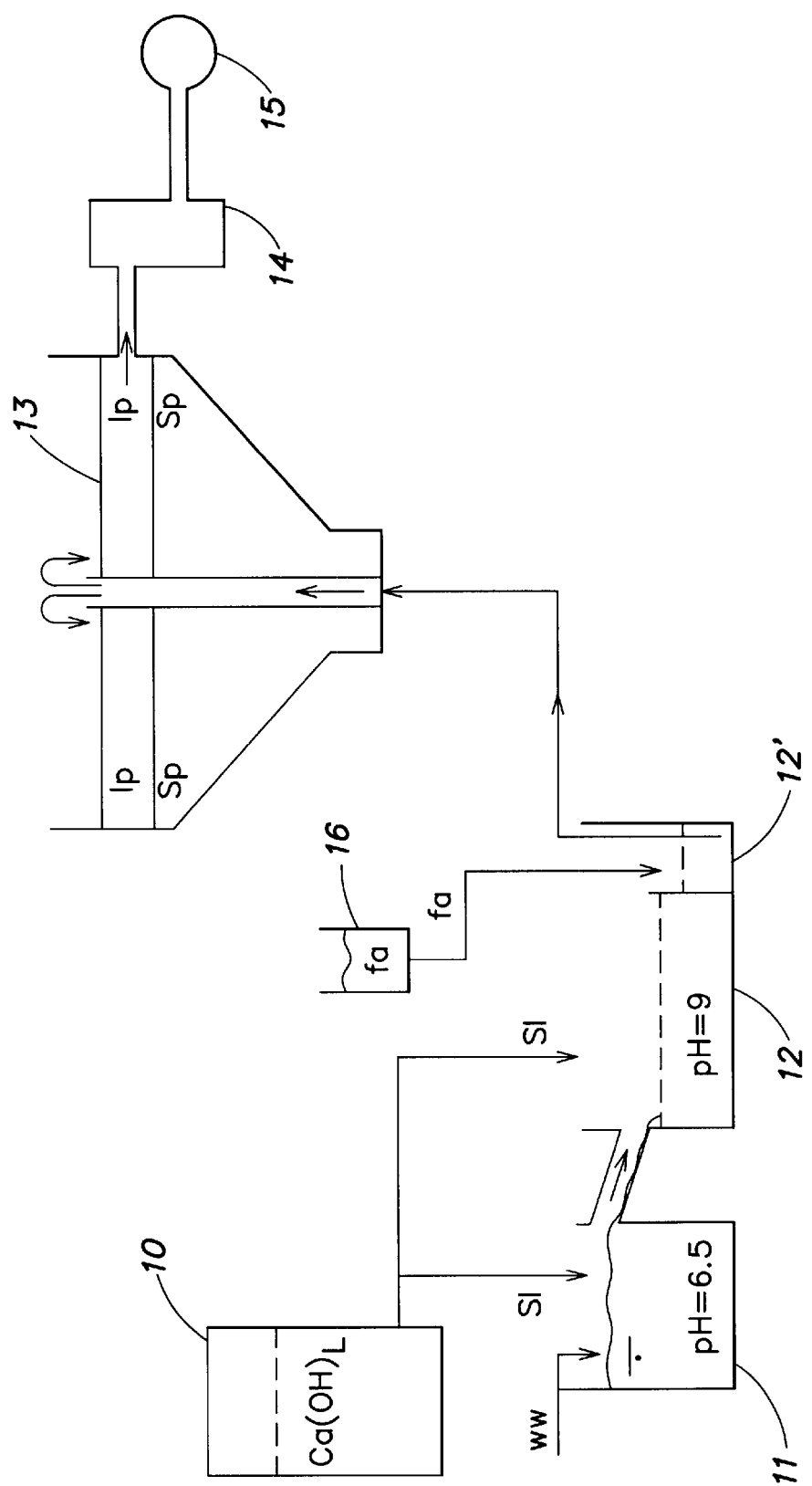
FIG. 1, previously described, is meant to show the state of the art and the problem to solve.

At this stage, instead of performing the steps of decantation and extraction of the conventional method (13 to 14, FIG. 1), an additional neutralization of the solution is performed, which brings the pH back to a value higher than the pH limit of the water at the end of the wast water processing, set by the legislation (for example, 5.5) and, preferably, substantially neutral, included between 6.8 and 7. This neutralization is an acid neutralization, or acidification, that is, in the context of the present invention, a step of mixing to a compound likely to liberate dissolved protons.

According to the present invention, an excess of calcium ions is maintained at the end of the basification step (basic pre- and post-neutralization). This excess is used in the acid neutralization step to precipitate fluoride ions coming from the dissociation of "complex" salts. The pH value of the post-neutralized solution must, in the above-mentioned precipitation conditions, be sufficiently low to be able to perform the acid neutralization step by using a minimum amount of acid. A satisfying compromise value is on the order of 8.2.

It will be obvious for those skilled in the art that neutralization acid na, brought from a vessel 28, can on no account be hydrofluoric acid (HF) which would reintroduce, in the solution, fluoride ions that the method precisely has the purpose of removing.

Further, attention will be paid to avoiding any acid which would induce additional steps of purification of other elements eventually formed due to the addition of this acid, such as, for example, phosphates which would come from the use of phosphoric acid ($H_3PO_4$) and which would also be harmful if released into the environment.

A preferred acid is sulfuric acid ($H_2SO_4$) which has the advantages of a rapidity of pH decrease increased by its double acid function, of a relatively low cost, and of the absence of any specific additional downstream reprocessing.

Finally, a step of flocculence of the acidified effluents is preferably performed, for example, in a compartment 23' of a vessel 23 in which the acidification is performed, by bringing flocculents fa from a storage vessel 27. Then, a step of decantation (decanter 24) and extraction of liquid phase lp and solid phase sp is performed, after which steps of tests on this liquid phase lp, generally represented by a vessel 25, and finally a step of removal, for example, by an urban sewage system 26, are performed.

Concentrations of fluoride ions on the order of 8 to 11 mg/l, and thus much lower than those obtained by the conventional method and the standard in force (15 mg/l) are thus obtained.

Preferably, the total contact time for the entire processing (in vessels 21, 22, 22', 23, 23') is sufficiently long (for example, 30 to 40 minutes) for all chemical compounds to completely react and to enable to obtain the desired fluoride concentrations.

Of course, the present invention is likely to have various alterations, modifications, and improvements which will readily occur to those skilled in the art. In particular, the acid used can be any acid other than hydrofluoric acid (HF) or than an acid requiring an additional processing of the formed salts, for example, phosphoric acid ($H_3PO_4$). Further, although the method has been described in relation with a silicon processing method, it can apply to many other industrial uses of fluorine, or even be part of a sewerage clarification method including other purification processings than a defluoridation, before as well as after.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of defluoridation of waste water, including a step of acid neutralization, using a single compound, between a basic neutralization step, using a single compound, and a decantation step, wherein the basic neutralization step includes a pre-neutralization step adjusting the pH to a first value and a post-neutralization step adjusting the pH to a second value, and the acid neutralization step is performed until reaching a substantially neutral or very slightly acid pH comprised between 5.5 and 7.

2. The method of claim 1, wherein the acid neutralization step is performed by addition of an acid other than hydrofluoric acid.

3. The method of claim 1, wherein the waste water comes from silicon processing.

4. The method of claim 1, wherein the acid neutralization step is performed by addition of sulfuric acid.

5. The method of claim 1, including the following steps:
basic pre-neutralization until a pH value of 6.5 is reached, by mixing the waste water with dead lime;
basic post-neutralization until a pH value of 8.2 is reached, by mixing the pre-neutralized solution with dead lime;
acid neutralization until a pH value included between 5.5 and 7 is reached;
decantation coupled with operations of continuous extraction of the liquid phase; and
removal of the defluorided effluents.

6. A method of purification of waste water, comprising the step of acid neutralization, using a single compound, between a basic neutralization step, using a single compound, and a decantation step, wherein the basic neutralization step includes a pre-neutralization step adjusting the pH to a first value and a post-neutralization step adjusting the pH to a second value, and the acid neutralization step is performed until reaching a substantially neutral or very slightly acid pH comprised between 5.5 and 7.

7. The method of claim 6, wherein the acid neutralization step is performed by addition of an acid other than hydrofluoric acid.

8. The method of claim 6, wherein the waste water comes from silicon processing.

9. The method of claim 6, wherein the acid neutralization step is performed by addition of sulfuric acid.

10. The method of claim 6, including the following steps:
basic pre-neutralization until a pH value of 6.5 is reached, by mixing the waste water with dead lime;
basic post-neutralization until a pH value of 8.2 is reached, by mixing the pre-neutralized solution with dead lime;
acid neutralization until a pH value included between 5.5 and 7 is reached;
decantation coupled with operations of continuous extraction of the liquid phase; and
removal of the defluorided effluents.

11. A method of purifying waste water comprising:
mixing waste water with a basic compound to form a first solution having a first pH;
mixing the first solution with a basic compound to form a second solution having a second pH;
mixing an acid with the second solution to form a third solution having a third pH; and
decanting liquid from the third solution.

12. The method of claim 11, wherein the waste water is mixed with the basic compound to form a first solution in a first vessel.

13. The method of claim 11, wherein the first solution is transferred to a second vessel prior to mixing with the basic compound to form the second solution.

14. The method of claim 13, wherein the second solution is transferred to a third vessel prior to mixing with the acid to form the third solution.

15. The method of claim 11, wherein the first pH is about 6.5.

16. The method of claim 11, wherein the second pH is about 8.2.

17. The method of claim 11, wherein the third pH is between about 5.5 and 7.

18. The method of claim 11, wherein the same basic compound is mixed with the waste water and the first solution.

19. The method of claim 18, wherein the basic compound is $Ca(OH)_2$.

20. The method of claim 11, wherein the acid is sulfuric acid.

* * * * *